United States Patent
Andrus et al.

[11] 3,926,602
[45] Dec. 16, 1975

[54] GLASS-CERAMIC ARTICLES WITH REFLECTIVE SURFACES

[75] Inventors: Ronald L. Andrus, Elmira; Richard F. Reade, Corning, both of N.Y.

[73] Assignee: Corning Glass Works, Corning, N.Y.

[22] Filed: June 19, 1974

[21] Appl. No.: 480,961

[52] U.S. Cl. .................. 65/33; 65/30; 106/39.7; 106/39.8; 350/1; 350/288
[51] Int. Cl.² .................. C03B 32/00; G02B 5/20
[58] Field of Search ............ 65/33, 30 R; 106/39.7, 106/39.8; 350/1, 288

[56] References Cited
UNITED STATES PATENTS

| | | | |
|---|---|---|---|
| 3,455,706 | 7/1969 | Takagi et al. | 65/33 X |
| 3,528,828 | 9/1970 | Smith | 65/33 X |
| 3,557,575 | 1/1971 | Beal | 65/33 |
| 3,788,865 | 1/1974 | Babcock et al. | 65/33 X |
| 3,799,836 | 3/1974 | Rogers et al. | 65/33 |
| 3,854,986 | 12/1974 | Chvalovsky et al. | 65/3 X |
| 3,876,407 | 4/1975 | Hirose et al. | 65/30 R |

FOREIGN PATENTS OR APPLICATIONS
146,929   1/1965   U.S.S.R. .......................... 106/39.7

Primary Examiner—S. Leon Bashore
Assistant Examiner—Frank W. Miga
Attorney, Agent, or Firm—Clinton S. Janes, Jr.; Clarence R. Patty, Jr.

[57] ABSTRACT

This invention is concerned with the production of glass-ceramic articles from glasses within the $Li_2O$—$FeO$—$Al_2O_3$—$SiO_2$ system which, when nucleated with $TiO_2$ or a combination of $TiO_2$ and $ZrO_2$ and exposed to carefully-defined heat treatments, will crystallize in situ to bodies having highly-durable integral surfaces exhibiting distinctly metallic lusters. The lustrous surfaces are reflective to visible light and, when developed upon previously polished surfaces, can produce mirror-like finishes with good color and spatial reproduction of reflected images. On slightly irregular or non-planar surfaces as, for example, fractured or as-poured surfaces, an appearance similar to metal plating is observed.

7 Claims, No Drawings

GLASS-CERAMIC ARTICLES WITH REFLECTIVE SURFACES

A glass-ceramic article is the product resulting from heat treating a glass body in a controlled manner to cause the crystallization in situ thereof. The production of a glass-ceramic article commonly comprises three general steps. First, a glass-forming batch is compounded to which a nucleating agent is normally included. Second, the batch is melted and the melt simultaneously cooled and shaped into a glass article of a desired geometry. The cooling is sufficiently rapid to yield an essentially crystal-free glass body. Third, the glass body is exposed to a specific time-temperature heat treating schedule to cause the glass to crystallize in situ. Under the preferred practice, this third step is carried out in two parts. That is, the glass article is initially heated to a temperature in the vicinity of the annealing point thereof to generate nuclei therein. Thereafter, the temperature is elevated (commonly above the softening point of the glass) to foster the growth of crystals on the nuclei.

Inasmuch as the crystallization in situ phenomenon contemplates the substantially simultaneous growth of crystals on countless nuclei distributed throughout the dimensions of a glass body, the microstructure of a glass-ceramic article normally consists of relatively uniformly-sized, fine-grained crystals homogeneously dispersed, but randomly oriented, within a residual glassy matrix, the crystal phase customarily constituting the predominant proportion of the article. Therefore, glass-ceramic articles are commonly greater than 50% by weight crystalline and, frequently, exceed 75% by weight crystalline. The very high percentage of crystallinity in glass-ceramic articles conventionally results in those articles demonstrating chemical and physical characteristics quite different from those of the parent glass. Hence, commonly, the properties of the glass-ceramic article will approximate those displayed by the crystal phase present therein. Finally, the residual glassy matrix will not only comprise but a small proportion of the glass-ceramic product, but also will have a materially different composition from that of the parent glass. This latter situation is the result of the constituents comprising the crystal phase having been precipitated therefrom during the crystallization in situ.

Since the manufacture of glass-ceramic articles is founded upon the crystallization in situ of glass articles, forming processes conventional in the glass art such as blowing, casting, drawing, pressing, rolling, etc., can be utilized in shaping bodies of desired geometries and dimensions. Furthermore, the presence of the residual glassy matrix dictates that a glass-ceramic body will be essentially free from voids and non-porous.

A more extensive presentation of the theoretical concepts and practical considerations inherent in the manufacture of glass-ceramic articles can be found in U.S. Pat. No. 2,920,971, the basic patent in the field of glass-ceramics. That patent defines a glass-ceramic article as being predominantly crystalline and elucidates the mechanism involved in the production of glass-ceramics, viz., that the crystal phases developed are a function of the parent glass composition and the particular heat treatment to which the parent glass is subjected.

The present invention provides glass-ceramic bodies having highly-durable, integral surface layers demonstrating distinctly metallic lusters, which are highly reflective to visible light and, when produced upon polished surfaces, can display mirror-like finishes exhibiting excellent color and spatial reproduction of reflected images. On slightly irregular or nonplanar surfaces, such as fractured or as-poured surfaces, an appearance simulating that achieved in metal plating is obtained.

Such bodies are produced by melting batches for glasses consisting essentially, in weight percent on the oxide basis, of about 0.5–3.5% FeO, 3–6% $Li_2O$, 16–21% $Al_2O_3$, 65–75% $SiO_2$, and 1.5–7% $RO_2$, wherein $RO_2$ consists of 1.5–6% $TiO_2$ and 0–3% $ZrO_2$. The molten batches are then simultaneously cooled to at least within the transformation range and glass articles of a desired geometry shaped therefrom. (The transformation range is that temperature at which a glass melt is deemed to have been transformed into an amorphous solid. That temperature has conventionally been considered to lie in the vicinity of the annealing point of the glass.) The glass articles are thereafter exposed to temperatures within the range of about 850°–1025°C. for a period of time sufficient to cause the growth of crystals therein. The rate of crystal growth is dependent upon the temperature utilized. Therefore, longer exposure periods will be required at the cooler extreme of the operable range to achieve the same degree of crystallization.

Laboratory experimentation has manifested that the heat treatment temperature must be maintained below about 1025°C. in order to secure bodies displaying the desired lustrous surfaces. Where crystallization is undertaken at temperatures of 1050°C. and higher, the resultant articles normally display dull, non-reflective surfaces. Crystallization at temperatures below about 850°C. is so slow as to be economically unattractive.

Commonly, the glass article will be cooled to room temperature to permit inspection of glass quality but such practice is not mandatory. Production efficiencies and fuel economics can be enjoyed where the glass is only cooled to within the transformation range before heat treatment.

Inasmuch as a more uniformly fine-grained crystallization is normally obtained where a preliminary nucleation step is employed, the preferred practice of the instant invention contemplates nucleating the glass body for about 1–6 hours at about 750°–850°C. and then subjecting the nucleated body to a temperature between about 850°–1025°C. for about 1–8 hours. It can be appreciated that no specific dwell temperature within those ranges is demanded but only that the article be maintained therewithin for the cited periods.

Examination of the crystallized bodies of the present invention through electron microscopy and X-ray diffraction analysis indicated that the interior portion thereof was highly crystalline and contained beta-quartz solid solution as the sole or predominant crystal phase. The crystals were very fine-grained, i.e., less than about 5 microns in diameter. Surface X-ray diffraction techniques were unable to discern a crystalline surface phase, therefore suggesting a surface layer having a thickness of less than a few thousand angstroms. A surface layer of about 550 A was measured on Example 5, utilizing heat treatment Schedule D, infra, utilizing interferometric techniques. Electron diffraction analyses determined the presence of hematite (alpha-$Fe_2O_3$) in the surface layer.

X-ray diffraction analyses of articles crystallized in situ at temperatures of 1050°C. and higher demonstrated that beta-spodumene solid solution, rather than beta-quartz solid solution, constituted the sole or predominant crystal phase. Hence, temperatures between about 850°–1025°C. are required for crystallization to develop glass-ceramic bodies containing beta-quartz solid solution crystals which exhibit good surface lusters.

The amber-colored, beta-quartz solid solution-containing interior portion of the article will exhibit a degree of transparency depending upon the amount of iron in the base composition. For example, in relatively thin-walled articles (less than about ¼ inch) with iron levels less than about 1%, a one-way mirror effect can be produced where one of a pair of parallel reflecting surfaces is removed and the underlying beta-quartz solid solution surface is polished. High iron levels cause sufficiently dense opacity that all polished, reflective surfaces act as conventional mirrors. The color and spatial rendering of reflected images approaches that of the silvered or aluminized mirrors.

Table I records, in weight percent on the oxide basis, a group of glass compositions operable in the present invention. The batch ingredients can comprise any materials, either the oxide or other compound, which, when melted together, will be converted into the desired oxide in the proper proportion. The batch materials where compounded, mixed together in a ball mill to assist in securing a homogeneous melt, and then run into platinum crucibles. The crucibles were placed in a gas-fired furnace, melted at 1550°–1675° for 16 hours, the melts rolled into glass plates about 10 × 4 × 1/2 inches, and the plates immediately transferred to annealers operating at 550°–700°C. $As_2O_3$ is present in several of the following examples in its conventional capacity as a fining agent.

retained therein. As was observed earlier, heat treatments of these examples at 1050°C. and higher yielded bodies containing beta-spodumene solid solution crystals and having dull, non-reflective surfaces, the color thereof varying from olive, yellow-brown to brown. The beta-spodumene solid solution-containing interior was an opaque gray color.

TABLE II

Schedule A: Heat at 300°C./hour to 800°C.
Hold thereat for four hours
Heat at 100°C./hour to 875°C.
Hold thereat for one hour.
Schedule B: Heat at 300°C./hour to 800°C.
Hold thereat for four hours
Heat at 100°C./hour to 875°C.
Hold thereat for four hours.
Schedule C: Heat at 200°C./hour to 900°C.
Hold thereat for four hours
Heat at 200°C./hour to 1000°C.
Hold thereat for one hour.
Schedule D: Heat at 250°C./hour to 750°C.
Hold thereat for four hours
Heat at 50°C./hour to 850°C.
Hold thereat for four hours
Heat at 50°C./hour to 950°C.
Hold thereat for four hours.

The composition parameters detailed above appear to be vital in achieving the desired product. For example, iron contents less than about 0.5% FeO do not provide a lustrous surface layer, whereas above about 3.5% FeO promotes extensive phase separation and hazards dicing as the glass body is body cooled from the melt and annealed. The $Li_2O$, $Al_2O_3$, and $SiO_2$ levels are required to insure the development of the proper beta-quartz solid solution crystals in the interior portion of the body and the lustrous surface layer containing alpha-hematite crystals. The most desirable properties

TABLE I

| | 1 | 2 | 3 | 4 | 5 | 6 | 7 | 8 | 9 |
|---|---|---|---|---|---|---|---|---|---|
| $SiO_2$ | 68.64 | 68.38 | 70.94 | 70.77 | 70.59 | 70.44 | 70.28 | 71.33 | 73.88 |
| $Al_2O_3$ | 20.06 | 19.99 | 17.77 | 17.73 | 17.69 | 17.64 | 17.60 | 18.04 | 16.19 |
| $Li_2O$ | 5.12 | 5.10 | 4.70 | 4.52 | 4.35 | 4.17 | 3.99 | 4.43 | 4.13 |
| FeO | 1.37 | 1.36 | 0.81 | 1.21 | 1.61 | 2.01 | 2.40 | 1.64 | 1.10 |
| $TiO_2$ | 4.56 | 2.43 | 4.20 | 4.19 | 4.18 | 4.17 | 4.16 | 4.56 | 4.50 |
| $ZrO_2$ | — | 2.49 | 1.14 | 1.14 | 1.14 | 1.13 | 1.13 | — | — |
| $As_2O_3$ | 0.25 | 0.25 | 0.44 | 0.44 | 0.44 | 0.44 | 0.44 | — | 0.20 |

| | 10 | 11 | 12 | 13 | 14 | 15 | 16 | 17 | 18 | 19 |
|---|---|---|---|---|---|---|---|---|---|---|
| $SiO_2$ | 67.46 | 70.74 | 70.23 | 71.23 | 70.94 | 70.64 | 70.06 | 70.25 | 70.55 | 72.64 |
| $Al_2O_3$ | 17.74 | 17.72 | 17.60 | 17.84 | 17.77 | 17.70 | 17.55 | 17.60 | 17.68 | 18.20 |
| $Li_2O$ | 4.36 | 3.69 | 3.66 | 3.38 | 3.86 | 4.02 | 3.98 | 3.33 | 4.34 | 3.78 |
| FeO | 1.61 | 1.61 | 1.60 | 1.46 | 1.62 | 1.21 | 1.20 | 1.44 | 1.61 | 3.31 |
| $TiO_2$ | 3.81 | 3.81 | 3.78 | 4.51 | 3.82 | 4.47 | 4.44 | 4.45 | 4.18 | 1.84 |
| $ZrO_2$ | 1.04 | 1.04 | 1.03 | — | 1.04 | — | — | — | 1.14 | — |
| $As_2O_3$ | — | — | — | 0.22 | — | 0.22 | 0.22 | 0.44 | 0.23 | — |
| $P_2O_5$ | 3.98 | — | — | — | — | — | — | — | — | — |
| $Na_2O$ | — | 1.39 | — | — | — | — | — | — | — | — |
| $K_2O$ | — | — | 2.10 | — | — | — | — | — | — | — |
| MgO | — | — | — | 1.36 | — | — | — | — | — | — |
| CaO | — | — | — | — | 0.95 | — | — | — | — | — |
| SrO | — | — | — | — | — | 1.74 | — | — | — | — |
| BaO | — | — | — | — | — | — | 2.55 | — | — | — |
| ZnO | — | — | — | — | — | — | — | 2.71 | — | — |
| SnO | — | — | — | — | — | — | — | — | 0.06 | — |

Table II reports heat treatment Schedules A, B, C, and D which are applied to the glass plates of Examples 1–19 in electrically heated furnaces. Each of the schedules produced highly crystalline, glass-ceramic bodies exhibiting a desirable surface luster except in the cases of Examples 13 and 17, which required the use of Schedule C. In general, the articles were cooled to room temperature at furnace rate, i.e., the electric power to the furnace was shut off with the articles are secured where the mole ratio of $Al_2O_3:Li_2O + FeO$ is greater than about 0.96. The inclusion of $TiO_2$ as at least a secondary nucleant appears necessary since the use of $ZrO_2$ alone as the nucleating agent commonly leads to cracking and surface spalling of the body because of the limited solubility thereof in these compositions.

As can be observed in Table I, minor amounts of extraneous oxides can be tolerated and may be useful in improving the melting and forming character of the glass or in altering a specific physical property of the parent glass or the final glass-ceramic article. However, in general, the preferred compositions are contained within the quinary FeO—Li$_2$O—Al$_2$O$_3$—SiO$_2$—RO$_2$, and the sum of all the optional ingredients will desirably constitute no more than about 5% of the total.

A measurement utilizing the visible portion of the spectrum (4000–7000 A) on Example 5 after exposure to Schedule A showed a specular luminous reflectance of 44%. However, in the infrared portion of the spectrum, reflectance dropped to about 10–15%, but the transmittance through a 1 mm. thick sample with parallel reflecting surfaces reached about 70% at a wave length of 2.5 microns. This latter characteristic would indicate that a substantial portion of the iron in the body is present in the ferric (Fe$^{+3}$) state. A determination of surface resistivity elicited a value of about $5.7 \times 10^{10}$ ohms/square. Where Example 5 was subjected to Schedule A, but contained within a closed chamber packed with graphite to yield a reducing atmosphere, the resulting surface was dull and the surface resistivity was altered to about $1.8 \times 10^{13}$ ohms/square. A coefficient of thermal expansion (0°–800°C.) of $1.1 \times 10^{-7}$/°C. was measured on Example 5 exposed to Schedule D.

The reflective, lustrous character of the surface displayed by the articles of the present invention appears quite resistant to many standard reagents. Table II lists a number of tests which were performed on the plates of Table I. Each sample appeared to be unaffected at the conclusion of the test.

TABLE III

| Reagent | Temperature | Time in Hours |
| --- | --- | --- |
| Distilled H$_2$O | 95°C. | 48 |
| 2N NaCl | 95°C. | 48 |
| 2N HCl | 25°C. | 120 |
| 2N NaOH | 25°C. | 120 |
| 2N HNO$_3$ | 25°C. | 24 |
| 2N H$_2$SO$_4$ | 25°C. | 24 |

The surfaces were also resistant to 0.5N H$_2$SO$_4$ at 95°C. for at least 1 hour, but were completely removed from the underlying beta-quartz solid solution-containing interior portion of the plate during an overnight test (about 16 hours). The thus-exposed surface had a polished appearance.

Surface reflectivity along with color and sharpness of reflected images can be improved by immersing the bodies in boiling concentrated HNO$_3$ for about 15 minutes. The surface luster of the as-crystallized bodies can be removed by immersion in boiling concentrated HCl for 10–15 minutes. Contact with boiling concentrated H$_2$SO$_4$ has proven to be less effective than boiling concentrated HCl in removing the surface luster.

The as-crystallized surfaces retained their luster after vigorous hand rubbing with water slurries of abrasive laboratory cleaning compounds. Finally, a 16-hour exposure to a 200 watt high pressure mercury arc at 6 inches from the sample produced no discoloration of the metallic luster.

To investigate the possibility of reconstructing the reflective surfaces after their removal, two experiments were conducted. In the first, the reflective surfaces were removed with 600 grit SiC paper followed by a diamond lap to secure a good polish. The second involved utilizing the polished-appearing surfaces resulting from the 16 hour immersion in 0.5 N H$_2$SO$_4$ at 95°C. Both groups of samples were exposed at temperatures between 800°–900°C. for periods of time ranging between about 1–16 hours. In no instance was a reflective surface reconstituted. That phenomenon leads to the belief that the substrate immediately below the original reflective surface is depleted in the essential iron ions needed to form a new lustrous surface. However, upon grinding to a further depth of no more than about 1 mm and repolishing, a new mirror surface could be developed employing the heat treating schedules of Table II.

Although the initial crystallization heat treatment of the parent glass article will be undertaken at temperatures between about 850°–1025°C. to secure the desired lustrous surface layer, the beta-quartz solid solution-containing glass-ceramic body of the present invention having the desired lustrous surface layer can be subsequently heat treated at temperatures of 1050°C. and higher to cause conversion of the transparent beta-quartz solid solution to fine-grained, opaque beta-spodumene solid solution without destroying the reflective surfaces. However, prolonged heat treatment, e.g., 16 hours at 1050°C., leads to the development of a second underlying skin exhibiting an opaque brown coloration which distorts the color rendition of the still intact reflective surface. This opaque underlying skin can be exposed by etching away the outer reflective surface utilizing 0.5N H$_2$SO$_4$ at 95°C. The exposed skin displays a siliceous beta-quartz X-ray diffraction pattern whereas the substrate crystal phase is a beta-spodumene solid solution.

We claim:

1. A method for making a glass-ceramic article composed of a body portion and a highly-durable, integral surface layer exhibiting a reflective, metallic luster, said body portion consisting essentially of beta-quartz solid solution crystals dispersed within a glassy matrix and said integral surface layer consisting essentially of hematite (alpha-Fe$_2$O$_3$) crystals dispersed within a glassy matrix, comprising the steps of:

a. melting a batch for a glass consisting essentially, in weight percent on the oxide basis, of about 0.5–3.5% FeO, 3–6% Li$_2$O, 16–21% Al$_2$O$_3$, 65–75% SiO$_2$, and 1.5–7% RO$_2$, wherein RO$_2$ consists of 1.5–6% TiO$_2$ and 0–3% ZrO$_2$;

b. simultaneously cooling the melt to at least within the transformation range and forming a glass article of a desired configuration therefrom;

c. exposing said glass article to a temperature between about 850°–1025°C. for a period of time sufficient to cause the growth of beta-quartz solid solution crystals in situ in said body portion and the growth of hematite (alpha-Fe$_2$O$_3$) crystals in situ in said surface layer; and d. cooling to room temperature.

2. A method according to claim 1 wherein said glass article is first exposed to a temperature between about 750°–850°C. for about 1–6 hours and thereafter to a temperature between about 850°–1025°C. for about 1–8 hours.

3. A method according to claim 1 wherein said FeO is less than about 1% such that said glass-ceramic article exhibits transparency.

4. A method according to claim 1 wherein said surface layer of said glass-ceramic article is no more than several thousand angstroms thick.

5. A method for making an opaque glass-ceramic article composed of a body portion and a highly-durable, integral surface layer exhibiting a reflective, metallic luster, said body portion consisting essentially of beta-spodumene solid solution crystals dispersed within a glassy matrix and said integral surface layer consisting essentially of hematite (alpha-$Fe_2O_3$) crystals dispersed within a glassy matrix, comprising the steps of:

a. melting a batch for a glass consisting essentially, in weight percent on the oxide basis, of about 0.5–3.5% FeO, 3–6% $Li_2O$, 16–21% $Al_2O_3$, 65–75% $SiO_2$, and 1.5–7% $RO_2$, wherein $RO_2$ consists of 1.5–6% $TiO_2$ and 0–3% $ZrO_2$;

b. simultaneously cooling the melt to at least within the transformation range and forming a glass article of a desired configuration therefrom;

c. exposing said glass article to a temperature between about 850°–1025°C. for a period of time sufficient to cause the growth of beta-quartz solid solution crystals in situ in said body portion and the growth of hematite (alpha-$Fe_2O_3$) crystals in situ in said surface layer;

d. exposing said crystallized article to a temperature of at least 1050°C. for a period of time sufficient to convert said beta-quartz solid solution crystals to beta-spodumene solid solution crystals; and e. cooling to room temperature.

6. A method according to claim 5 wherein said glass article is first exposed to a temperature between about 750°–850°C. for about 1–6 hours, thereafter exposed to a temperature between about 850°–1025°C. for about 1–8 hours, and then exposed to a temperature of at least 1050°C. for at least 3 hours but less than 16 hours.

7. A method according to claim 5 wherein said surface layer of said glass-ceramic article is no more than several thousand angstroms thick.

* * * * *

UNITED STATES PATENT OFFICE
CERTIFICATE OF CORRECTION

PATENT NO. : 3,926,602
DATED : December 16, 1975
INVENTOR(S) : Ronald L. Andrus, Richard F. Reade It is certified that error appears in the above-identified patent and that said Letters Patent are hereby corrected as shown below:

Column 4, line 30, change the word "body" following is to -- being -- .

Column 5, line 29, change "Table II" to -- Table III -- .

Signed and Sealed this fifteenth Day of June 1976

[SEAL]

Attest:

RUTH C. MASON
Attesting Officer

C. MARSHALL DANN
Commissioner of Patents and Trademarks